(12) United States Patent
Collins et al.

(10) Patent No.: US 9,754,038 B2
(45) Date of Patent: Sep. 5, 2017

(54) INDIVIDUALLY DEPLOYABLE MANAGED OBJECTS AND SYSTEM AND METHOD FOR MANAGING THE SAME

(75) Inventors: Jeffrey M. Collins, Austin, TX (US); Margaret A. Martin, Austin, TX (US)

(73) Assignee: Open Text SA ULC, Halifax, CA (US)

( * ) Notice: Subject to any disclaimer, the term of this patent is extended or adjusted under 35 U.S.C. 154(b) by 2172 days.

(21) Appl. No.: 10/358,571

(22) Filed: Feb. 5, 2003

(65) Prior Publication Data
US 2014/0181280 A1    Jun. 26, 2014

(51) Int. Cl.
G06F 19/00    (2011.01)
G06F 17/30    (2006.01)

(52) U.S. Cl.
CPC .................. *G06F 17/3089* (2013.01)

(58) Field of Classification Search
USPC .................................................. 705/1, 50–59
See application file for complete search history.

(56) References Cited

U.S. PATENT DOCUMENTS

| | | | |
|---|---|---|---|
| 5,619,709 A | 4/1997 | Caid et al. | |
| 5,768,510 A * | 6/1998 | Gish | 709/203 |
| 5,774,888 A | 6/1998 | Light | |
| 5,982,891 A * | 11/1999 | Ginter et al. | 705/54 |
| 6,327,593 B1 | 12/2001 | Goiffon | |
| 6,389,589 B1 * | 5/2002 | Mishra et al. | 717/170 |
| 6,505,212 B2 | 1/2003 | Nakano et al. | |
| 6,523,028 B1 | 2/2003 | DiDomizio et al. | |
| 6,647,396 B2 | 11/2003 | Parnell | |
| 6,819,343 B1 * | 11/2004 | Sobeski | G06F 9/4443 715/762 |
| 6,826,594 B1 * | 11/2004 | Pettersen | G06F 17/30893 705/59 |
| 7,043,525 B2 * | 5/2006 | Tuttle et al. | 709/203 |
| 7,281,236 B1 | 10/2007 | Galvin et al. | |
| 7,574,496 B2 * | 8/2009 | McCrory et al. | 709/223 |
| 2001/0011265 A1 * | 8/2001 | Cuan et al. | |
| 2001/0044834 A1 * | 11/2001 | Bradshaw et al. | 709/217 |
| 2003/0005409 A1 * | 1/2003 | Tumati | 717/110 |
| 2003/0014442 A1 * | 1/2003 | Shiigi | G06F 8/20 715/255 |

OTHER PUBLICATIONS

Appel, Andrew W., A Runtime System, Princeton University, NJ, CS-TR-220-89, May 1989, 34 pgs.
"ASP Application Object", downloaded from the internet at <<http://www.w3schools.com/asp/asp_ref_application.asp>>, 4 pages, Sep. 8, 2008.

\* cited by examiner

*Primary Examiner* — John Hayes
*Assistant Examiner* — John M Winter
(74) *Attorney, Agent, or Firm* — Sprinkle IP Law Group (57) ABSTRACT

Systems and methods for enabling a user at an enterprise level to effect individual rules, processes and other functional items in site level environments by creating application objects corresponding to the functional items, wherein the objects have associated services, such as versioning and deployment, that allow them to be handled in the same manner as content objects. The application objects can be deployed to a site, where the associated functional items is implemented, thereby incrementally altering the setup of the site without having to make a wholesale substitution of the old setup with an entirely new one.

20 Claims, 5 Drawing Sheets

INDIVIDUALLY DEPLOYABLE MANAGED OBJECTS AND SYSTEM AND METHOD FOR MANAGING THE SAME

BACKGROUND OF THE INVENTION

Field of the Invention

The invention relates generally to computer systems and more particularly to systems and methods for managing Internet content, wherein rules, processes, and the like are handled as business objects (application objects) that have associated services similar to those of content objects and can be individually deployed and implemented.

Related Art

Many companies have a presence on the internet. For instance, a company may have a web site. The web site may be used to provide information about the company, to provide information about the industry or articles relating to the company's business, to enable customers to make inquiries or place orders, and so on.

Often, an enterprise may have many different web sites or internet properties. These internet properties may correspond to divisions of a company, or subsidiary companies and may provide information on the businesses, industries, events, and the like relating to each of the individual companies.

The enterprise typically exercises a certain level of control over the internet properties. For instance, the enterprise may wish for all of its internet properties to have the same look and feel and may therefore wish for the internet properties to share certain content. The enterprise may also wish for the internet properties to be configured in a particular way.

Traditionally, these goals were accomplished by providing complete content repositories or configuration files to the internet properties. In other words, if it was desired for an internet property to use shared content, the enterprise's content repository would be replicated in its entirety at the internet property. If there were changes to the content in the repository, the changes would not be propagated to the internet property until the entire content repository was again copied in its entirety to the internet property.

Similarly, if the enterprise wished to reconfigure one of its Internet properties, it would have to generate new configuration files in their entirety, and then deploy those files to the internet property. The internet property, upon receiving the new files and replacing the old files with them, would have to restart the applications running on the site in order to make the configuration changes effective.

This process of making changes to content or configuration information is inefficient and time consuming. This is particularly true in the case of enterprises that have large numbers of internet properties. Because the entire content repositories or configuration files have to be replaced, and applications potentially restarted, without regard to the magnitude of the actual changes therein, the content and configuration information may not be updated as often as it should (e.g., because the changes are minor, while the updates are costly).

SUMMARY OF THE INVENTION

One or more of the problems outlined above may be solved by the various embodiments of the invention. Broadly speaking, the invention comprises systems and methods for enabling a user at an enterprise level to effect individual rules, processes and other functional items in site level environments by creating objects corresponding to the functional items, wherein the objects have associated services, such as versioning, restoring, deploying, workflow, approval, authorization, archiving and reporting, among others, that allow them to be handled in the same manner as content objects. The functional items can therefore be used to incrementally alter the setup of a site without having to make a wholesale substitution of the old setup with an entirely new one.

In one embodiment, the present system is implemented in an internet content management environment in which sites, channels within the sites, and content objects within the channels and sites are defined. The sites, channels and content objects are each database objects that can be centrally managed. The content objects include items such as templates for page layouts that have several different sections, some of which are managed centrally (at the enterprise level) and some of which are managed locally (at the site level). The sections managed at the enterprise level are provided to the sites as part of the layout and cannot be changed at the site level. The other sections are essentially holes in the layout that need to be filled by the business user at the site level. The type of content with which the holes can be filled may be controlled at the enterprise level. For instance, a particular section may have to contain an ordered list of content items. The business user at the site level therefore fills the holes in the template, following any content rules or restrictions imposed at the enterprise level, and publishes the resulting page on the site.

An alternative embodiment may comprise a method for updating a site's runtime system. This embodiment may comprise the steps of creating a process as an application object, modifying the process in an enterprise environment, putting the modified process through an associated approval process, deploying the process as an individual object to a site environment, and implementing the process in the site's runtime system according to the object's binding. Changes in the operation of the runtime system can thereby be effected without having to replace the existing setup in its entirety. This may reduce bandwidth requirements, eliminate the need to restart applications, reduce downtime, and so on.

Another alternative embodiment may include an architecture for managing content shared among an enterprise's internet properties. In this architecture, an enterprise administrator manages a set of objects that inherit common services from a commonly derived set of classes. The objects include content objects and application objects. The content objects correspond to content items, channels and sites, and are linked to each other in to form channels within site structures. The application objects correspond to processes, rules, types and other functional items in the system. Because both content objects and application objects have the same services, they can both be handled in the same way. In particular, the application objects can go through workflow, be versioned, be deployed, and so on, in the same manner as content objects.

Another embodiment of the invention comprises a software application. The software application is embodied in a computer-readable medium such as a floppy disk, CD-ROM, DVD-ROM, RAM, ROM, database schemas and the like. The computer readable medium contains instructions which are configured to cause a computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

Numerous additional embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

A preferred embodiment of the invention is described below. It should be noted that this and any other embodiments described below are exemplary and are intended to be illustrative of the invention rather than limiting.

Broadly speaking, the invention comprises systems and methods for enabling a user at an enterprise level to effect individual rules, processes and other functional items in site level environments by creating objects corresponding to the functional items, wherein the objects have associated services, such as versioning, restoring, deploying, workflow, approval, authorization, archiving and reporting, that allow them to be handled in the same manner as content objects. These services may be referred to as content services. Because the functional items can be versioned, deployed, and so on, they can be used to incrementally alter the setup of a site without having to make a wholesale substitution of the old setup with an entirely new one.

In one embodiment, the present system is implemented in an internet content management environment in which sites, channels within the sites, and content objects within the channels and sites are defined. The sites, channels and content objects are each database objects that can be centrally managed. The content objects include templates for page layouts that have several different sections, some of which are managed centrally (at the enterprise level) and some of which are managed locally (at the site level). The sections managed at the enterprise level are provided to the sites as part of the layout and cannot be changed at the site level. The other sections are essentially holes in the layout that need to be filled by the business user at the site level. The type of content with which the holes can be filled may be controlled at the enterprise level. For instance, a particular section may have to contain an ordered list of content items. The business user at the site level therefore fills the holes in the template, following any content rules or restrictions imposed at the enterprise level, and publishes the resulting page on the site.

For the purposes of this disclosure, a "site" is an abstract object which represents a domain name and the hardware serving it. In the context of the invention, a site is purely a targeting mechanism which defines a destination into which content items from the content repository will be shared. A "channel" is a subdivision of a site. This provides a mechanism for grouping content items and for providing targeting on a finer granularity than the site. A "content item" is an item stored in the content repository. The content item has associated content services such as versioning, restoring, deploying, workflow, approval, authorization, archiving and reporting, categorizing and business process modeling. Although site structures within the present content management system actually contain shortcuts to the content items, these shortcuts will simply be referred to in the context of the site structure as content items for the sake of brevity.

The content that is used by the various sites in the enterprise is stored in a content repository. The content repository simply provides a central location for the content, from which it can be managed and deployed to the different sites of the enterprise. The content repository in one embodiment is organized as a file system.

Figure 1:
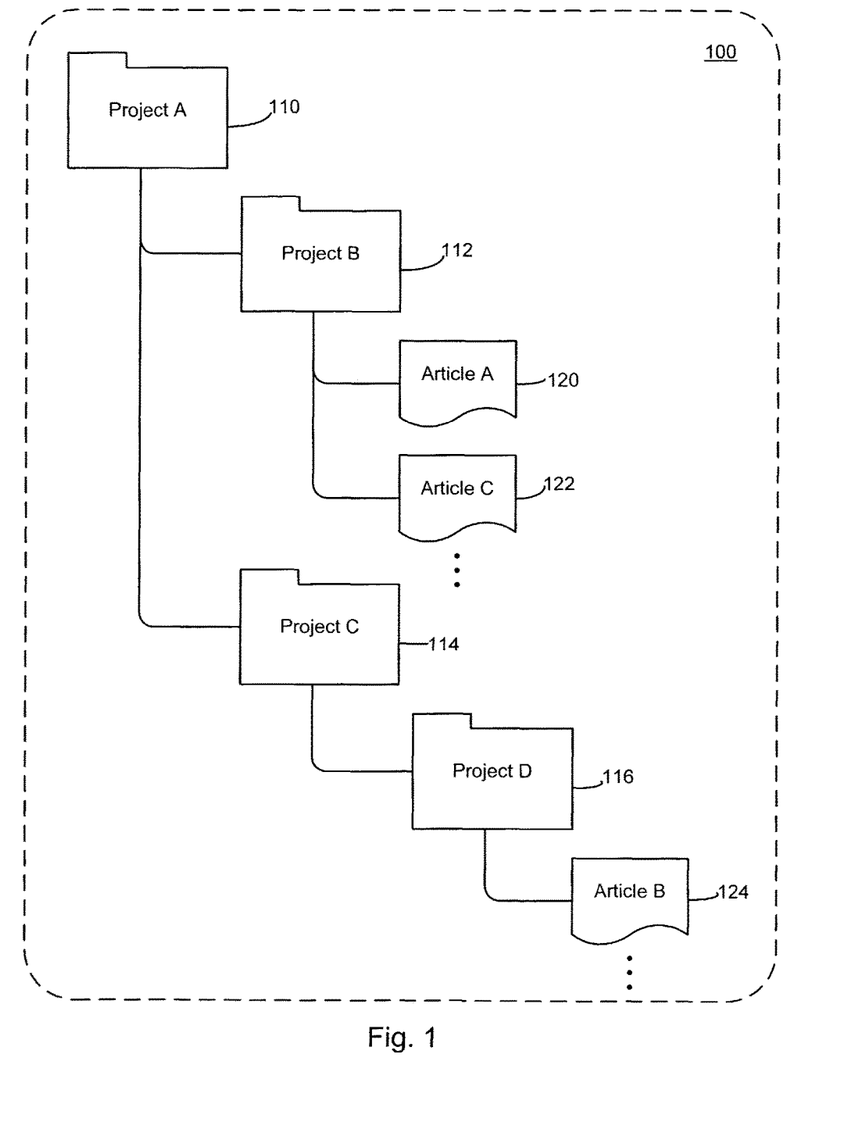
FIG. 1 is a diagram illustrating a file system structure of a content repository in one embodiment.

Referring to FIG. 1, a diagram illustrating the file system structure of the content repository in this embodiment is shown. The file system structure 100 comprises a set of folders or directories. Each of the directories may correspond to a project. As depicted in this figure, a root directory 110 has a series of subdirectories 112, 114. Subdirectory 112 contains a series of content items 120, 122, such as articles, graphics, etc. Subdirectory 114 contains its own subdirectories (116) as well as content items 124. It should be noted that the file system structure may have any combination of directories and content items and that the structure depicted in the figure is merely illustrative.

In the prior art, new content was provided to each of the different sites in an enterprise by making a copy of the content repository and sending the copy to the site. The newly received copy was then used to replace the old copy of the repository. In the present system, one or more site structures are defined, wherein objects within the site structure comprise links or shortcuts to the content items in the content repository. Each of the objects has a set of services associated with it. For example, in one embodiment, the objects can be versioned, they can be restored, they can be deployed, they can go through workflow, they can go through an approval process, and so on.

Figure 2:
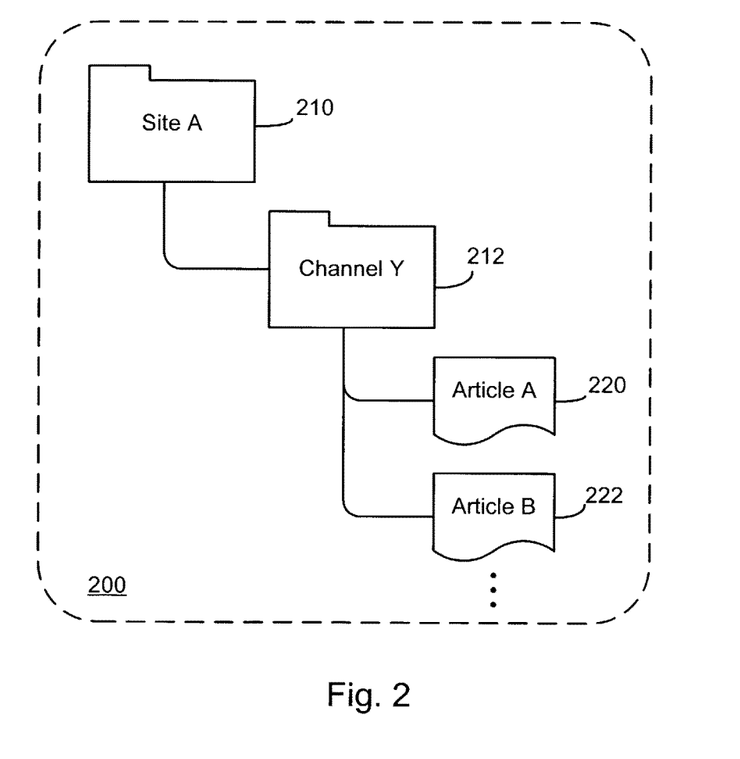
FIG. 2 is a diagram illustrating a hierarchical site structure which is linked to a content repository in one embodiment.

Referring to FIG. 2, a diagram illustrating a hierarchical site structure is shown. The top level of site structure 200 is Site A, indicated by reference number 210. below Site A (210) is Channel Y (212). Channel Y (212) contains a plurality of content items, including Articles A and B (220 and 222, respectively). Channels may also contain subchannels. Articles A and B are actually links to articles in content repository 100. Although only "articles" are depicted as being contained in Channel Y (212), links to other types of content (e.g., graphics or templates) may also be included in the channel.

Each of the objects is also linked to other objects in the site structure, so that the positions of the objects within the structure (with respect to the other, linked objects) is known. This enables the objects to be individually deployed. ("Individually," as used herein, is not intended to imply that the objects are actually handled separately in all instances, but is instead intended to emphasize that it is not necessary to copy all of the objects or information of the enterprise and transfer the copy to the site.) Thus, individual objects within the structure and content repository of a particular site can be replaced when newly deployed objects are received, thereby obviating the need to replace the entire content repository. This functionality can be extrapolated from objects that correspond to content items, such as text or graphics, to objects that correspond to functional things, such as rules or processes. For the sake of brevity, these things will be referred to herein as functional items, even though they are not items, strictly speaking.

Thus, in the present system, there are a number of objects that are defined in addition to the content items that normally reside in a content repository. These objects are referred to herein as application objects. The application objects are defined in the system in much the same manner as the content items. They do not, however, provide displayable content. They instead provide functionality which is not found in conventional content management systems. Application objects may include such things as rules, processes, types, and the like.

Figure 3:
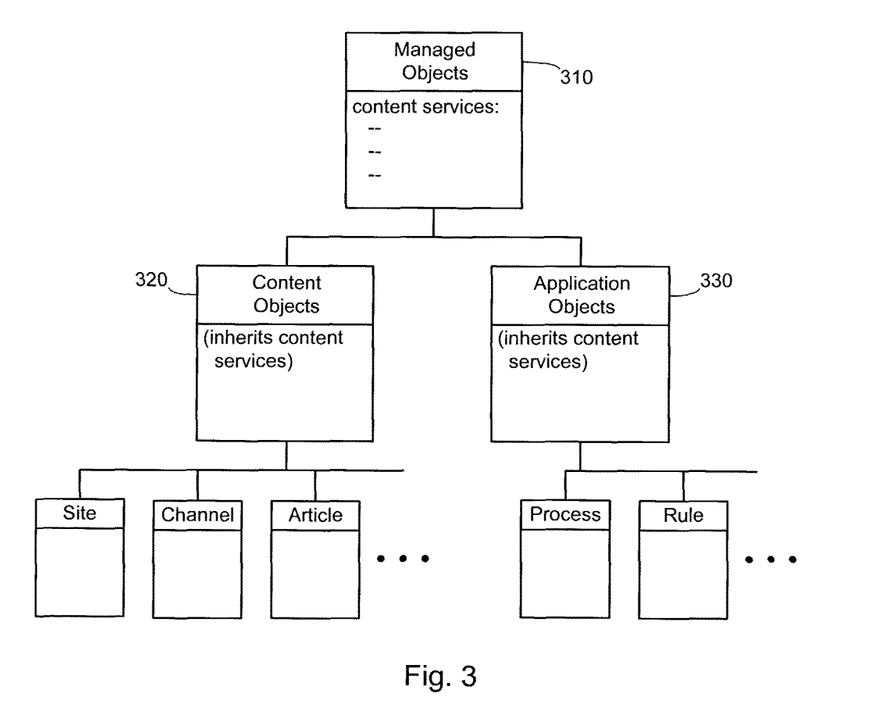
FIG. 3 is a diagram illustrating the inheritance of services by application objects from a managed object class in one embodiment.

Referring to FIG. 3, a diagram illustrating the inheritance of services by the application objects from a managed object class is shown. The managed object class is designated by reference number 310 in the figure. Managed object class 310 declares a set of services that are available to descendents of the class. Content object class 320 and application objects class 330 are subclasses of managed object class 310. Because subclasses inherit from their respective superclasses, the set of services declared by managed object class 310 is inherited by each of the content and application object subclasses 320 and 330.

Content object class 320 descends from managed object class 310 and inherits the services declared in managed object class 310. Because application class 330 also descends from managed object class 310, it inherits these same services, e.g., versioning, workflow, deployment, etc. As a result, application objects instantiated from classes 320 and 330 and their subclasses can be handled in essentially the same manner as content objects. For instance, application objects go through workflow, they are subject to approval processes, and they are deployable.

In one embodiment, the application objects are implemented in an enterprise content management system. In conventional content management systems, it was assumed that the only object that might need to be published was a content object. Any processes that needed to be performed, such as implementation of new rules or modification of the site setup (e.g., configuration information), were typically done locally at the site. Alternatively, changes could be made in the enterprise environment, and then the corresponding information could be copied in its entirety to the site. All the old configuration information would then be replaced with new information and the applications which use this information would have to be restarted.

In the present system, on the other hand, it is not necessary to replace an old site setup in its entirety with a new setup. If there is a process that has to be performed at the site, the process can be deployed to the site, where it can be automatically executed by the site's runtime system, thereby dynamically changing the behavior of the runtime system.

This is accomplished by creating the process as a an instantiation of a class which is itself a descendant of the content object class as shown in FIG. 3. As a descendant of the content object class, the subclass from which the process is instantiated inherits the services declared in the content object class. These services include versioning, restoring, deploying, workflow, approval, authorization, archiving, reporting, categorization, business process modeling and various others. Thus, the process can be versioned, deployed, etc.

Many of the benefits of having application objects are a result of these objects' inheritance of the same services as the content objects. Consider, for example, an application object corresponding to a process. This object has the same workflow, approval process and deployment services as a content object. The object is therefore handled, as shown in the flow diagram of FIG. 4, in the same manner as a content object. This figure shows the steps in the modification of a process and the implementation of the modified process in a site. This is shown graphically in FIG. 5.

Figure 4:
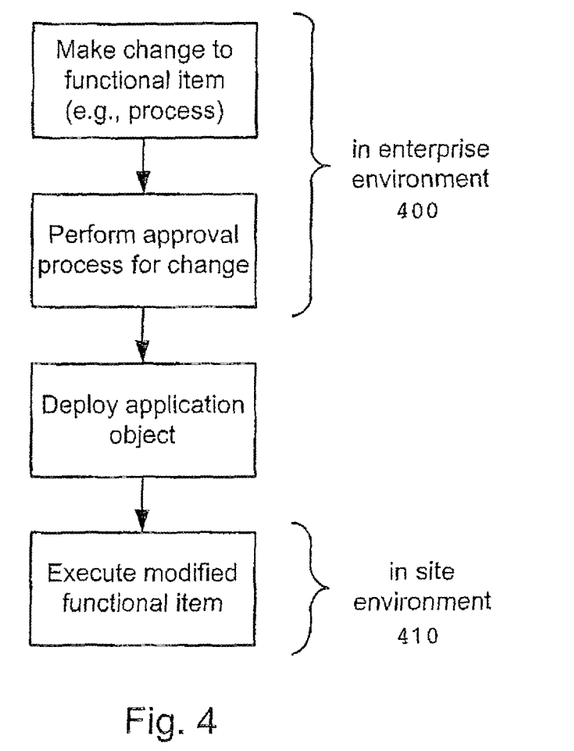
FIG. 4 is a flow diagram illustrating a simple method in accordance with one embodiment of the invention.
Figure 5:
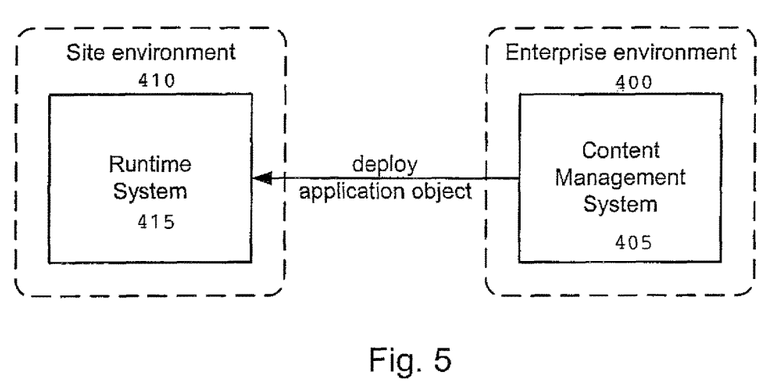
FIG. 5 is a functional block diagram illustrating the deployment of individual application objects from a content management system in an enterprise environment to a runtime system in a site environment in one embodiment.

As shown in FIG. 4, the process is modified (and a new version is created) by a content management system 405 in the enterprise environment 400. Enterprise environment 400 may be considered in this instance to be coextensive with the central server on which the content repository is stored and its related hardware. The changes are subject to the approval processes of the object. Once the changes to the process are approved, the object is deployed. The application object can be deployed to a remote site 410 individually, rather than as a part of a snapshot of the entire database of application objects. When the process is received at the site 410, it may now be executed by the runtime system 415 of the site. ("Site," in this context, refers to the endpoint hardware supporting the runtime system and the web site.) Runtime system 415 is dynamically changed by the process without having to restart the site's applications. This ability to deploy application objects into a hot (operational) runtime system is far beyond the capabilities of a conventional system.

Other types of application objects can also be individually deployed. When each of the application objects is received in the site environment, the object is executed or implemented according to its binding. Process objects are executed, rule and constraint objects are implemented, and so on. Because the application objects can be individually deployed to and implemented in the site environment, the present system is capable of making incremental updates to the site, rather than wholesale replacement of the site's runtime environment.

The use of application objects therefore provides a number of advantages over conventional systems and methods. For example, the ability to incrementally update sites by deploying application objects greatly simplifies the administrative effort of changing the site, both at the enterprise level, where the update is generated, and at the site level, where the update is implemented. Further, the transfer of application objects to update a site requires far fewer resources than the transfer of copies of entire databases of content or configuration information.

In one embodiment, a content management system contains all of the configuration data for a site. The configuration data is stored in a configuration database. The content management system includes a configuration server that accesses the configuration database and can send the configuration data to a configuration agent at the site. The configuration server is designed to send the configuration data to the configuration agent via an application object. The application object does not contain the entire configuration database, but instead contains only a portion of the configuration data from the database, as needed to update the configuration of the site. Configuration data that is not relevant to the site or to the updating of the site's configuration is not included.

The configuration server provides a means to centralize the administration of configuration management within the system. Configuration changes are pushed by the central configuration server out to all of the sites in the enterprise. If one of the sites desires a particular configuration change, a request for the change is pushed by the site's configuration agent to the central configuration server. In response to the request, the central configuration server pushes the requested change back to the requesting configuration agent. As a result, the central configuration server maintains synchronization with the site's configuration agent.

This configuration scheme provides a number of benefits. For example, the configuration data pushed to the configuration agent for a given site is relatively small in comparison to the replicated configuration database that were conventionally sent to the site to effect configuration changes. Another benefit is that the configuration changes are pushed out to the sites. Conventionally, the sites had to request the configuration data before it would be sent to the site. If no update was requested by the site, none would be sent. Another benefit is that the sites can request configuration changes instead of the site administrators having to either make changes locally or wait for potential updates from the configuration server. The sites' requests are pushed to the enterprise configuration server, which then pushes the requested changes back to the sites' configuration agents.

Another benefit of this configuration scheme is that the site administrator does not have to know the format of the configuration files in order to implement changes to the system's configuration. Effectively, the site configuration is managed by remote control at the enterprise level. Another benefit is that there is no need to restart any of the site applications as a result of the change in the configuration information. The change is implemented when received at the site and operation continues uninterrupted. Still another benefit is that, in one embodiment, the configuration agent is implemented in a parallel piece of code, so that configuration changes received from the enterprise are automatically detected and implemented.

The content management system and configuration scheme described above are merely exemplary of the many possible embodiments of the present invention. For example, another alternative embodiment may include an architecture for managing content shared among an enterprise's internet properties. In this architecture, an enterprise administrator manages a set of objects that inherit common services from a commonly derived set of classes. The objects include content objects and application objects. The content objects correspond to content items, channels and sites, and are linked to each other in to form channels within site structures. The application objects correspond to processes, rules, types and other functional items in the system. Because both content objects and application objects have the same services, they can both be handled in the same way. In particular, the application objects can go through workflow, be versioned, and be deployed in the same manner as content objects.

Another alternative embodiment may comprise a method for updating a site's runtime system. This embodiment may comprise the steps of creating a process as an application object, modifying the process in an enterprise environment, putting the modified process through an associated approval process, deploying the process as an individual object to a site environment, and implementing the process in the site's runtime system according to the object's binding. Changes in the operation of the runtime system can thereby be effected without having to replace the existing setup in its entirety. This may reduce bandwidth requirements, eliminate the need to restart applications, reduce downtime, and so on.

Another alternative embodiment of the invention comprises a software application. The software application may be embodied in any suitable medium readable by a computer or other data processor, such as a floppy disk, magnetic tape, CD-ROM, DVD-ROM, RAM, ROM, or the like. The computer readable medium contains instructions which are configured to cause the computer to execute a method which is generally as described above. It should be noted that the computer readable medium may comprise a RAM or other memory which forms part of a computer system. The computer system would thereby be enabled to perform a method in accordance with the present disclosure and is believed to be within the scope of the appended claims.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms 'comprises,' 'comprising,' or any other variations thereof, are intended to be interpreted as non-exclusively including the elements or limitations which follow those terms. Accordingly, a process, method, article, or apparatus that comprises a list of elements does not include only those elements but may include other elements not expressly listed or inherent to the claimed process, method, article, or apparatus.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for dynamically changing the functionality of a runtime system of a remote site, the method comprising:
in an internet content management environment comprising a central repository, managing a plurality of objects of a website, wherein the internet content management environment comprises a plurality of computer systems, and wherein the plurality of objects of the website inherit common services from a commonly derived set of classes, and the plurality of objects comprises content objects and application objects;
one or more of the plurality of computer systems in the internet content management environment deploying the plurality of objects of the website from the central repository to a remote site operating in a site environment, the remote site comprising one of a plurality of sites located remotely from the internet content management environment,
the remote site having endpoint hardware supporting a runtime system and the website,
the remote site operable to generate web pages and provide the web pages to clients,
wherein the content objects include templates for page layouts of content,
wherein the application objects include functional items comprising processes, and
wherein the application objects include configuration information for executing or implementing the processes at the website, the processes associated with applications at the website;

a computer system of the plurality of computer systems in the internet content management environment modifying a process, the process corresponding to a particular application object from the plurality of objects of the web site already remotely deployed to the remote site operating in the site environment;

one of the plurality of computer systems in the internet content management environment individually redeploying the particular application object from the central repository into the runtime system of the remote site to dynamically change operation of the runtime system of the remote site while the applications at the website supported by the runtime system of the remote site are executing, the particular application object corresponding to the process having been modified; and the runtime system running on the endpoint hardware of the remote site in the site environment executing or implementing the process according to the particular application object's binding, the process, having been modified and executed or implemented by the runtime system of the remote site operating in the site environment, dynamically changing operation of the remote site such that the processes of the runtime system are configured according to the configuration information of the application object, and dynamically changing operation of the runtime system of the remote site while the applications at the website supported by the runtime system of the remote site are executing, without having to replace an existing site setup, thereby eliminating a need to restart the applications at the website.

2. The method of claim 1, further comprising the internet content management environment maintaining the plurality of objects.

3. The method of claim 2, further comprising the internet content management environment utilizing a content management system to manage the plurality of objects of the web site.

4. The method of claim 1, further comprising the internet content management environment instantiating the application objects from one or more application object classes of the managed object class.

5. The method of claim 4, wherein at least one application object class inherits a set of services from the managed object class.

6. The method of claim 5, further comprising the internet content management environment instantiating the content objects from one or more content object classes of the managed object class, wherein at least one content object class inherits the set of services from the managed object class.

7. The method of claim 6, wherein the set of services inherited by the at least one application object class and the at least one content object class comprises one or more of versioning, restoring, deploying, workflow, approval, authorization, archiving, reporting, categorizing or business process modeling.

8. The method of claim 1, wherein each application object corresponds to one or more of a process, rule, type, site or channel.

9. A system for dynamically changing the functionality of a runtime system of a remote site, the system comprising:

a central server including a central repository and a processor in communication with one or more remote sites located remotely from the central server, each remote site having endpoint hardware supporting a corresponding runtime system and a website, the central server having instructions which when executed by the processor cause the central server to:

maintain a plurality of content objects of the website referencing content items and referencing other objects based on a hierarchical site structure and a plurality of application objects associated with the corresponding runtime system, wherein the plurality of content objects and the plurality of application objects inherit common services from a commonly derived set of classes, the plurality of application objects include functional items comprising processes, and wherein the plurality of application objects include configuration information for executing or implementing the processes at the website, the processes associated with applications at the website;

deploy the plurality of content objects and the plurality of application objects to the one or more remote sites from the central repository, wherein the one or more remote sites are operable to generate web pages and provide web pages to clients;

modify a process, the process corresponding to a particular application object from the plurality of objects of the website already deployed to the one or more remote sites; and individually redeploy the particular application object from the central repository into each corresponding runtime system of the one or more remote sites in communication with the central server to dynamically change operation of the runtime system of the remote site while the applications at the website supported by the runtime system of the remote site are executing, the particular application object corresponding to the process having been modified, wherein each of the one or more remote sites is configured to:

receive the particular application object from the central server; and execute or implement the process according to the particular application object's binding, wherein the process, having been modified and executed or implemented by each corresponding runtime system of the one or more remote sites, dynamically changes operation of the corresponding runtime system of the remote site such that the processes of the runtime system are configured according to the configuration information of the application object, and dynamically changing operation of the runtime system of the remote site while the applications at the website supported by the runtime system are executing, without having to replace an existing site setup, thereby eliminating a need to restart the applications at the website.

10. The system of claim 9, wherein the central server is further configured to individually deploy the content objects to the one or more remote sites.

11. The system of claim 10, wherein the content objects are associated with a channel in accordance with said hierarchical site structure.

12. The system of claim 9, wherein the central server is further configured to individually deploy the plurality of application objects.

13. The system of claim 9, wherein each remote site is configured to replace earlier versions of one or more deployed content objects at the site with more recently received versions of the one more deployed content objects.

14. The system of claim 9, further comprising a content management system application executing on the central server to instantiate the plurality of application objects from an application object class that inherits a plurality of content services from a parent class.

15. The system of claim 14, wherein the content management system application is further configured to instantiate a plurality of content objects from a content object class that inherits the plurality of content services from the parent class.

16. The system of claim 15, wherein the plurality of content services comprise one or more of: versioning, restoring, deploying, workflow, approval, authorization, archiving, reporting, categorizing, or business process modeling.

17. A non-transitory computer program product comprising a computer readable storage medium embodying computer program instructions which when executed by a computer system in a central internet content management environment cause the computer system to perform: instantiating content objects and application objects, wherein the plurality of content objects and the plurality of application objects inherit common services from a commonly derived set of classes, the application objects include the functional items comprise processes, wherein each of the content objects references another object according to a hierarchical site structure, and wherein the application objects include configuration information for executing or implementing the processes at a website, the processes associated with applications at the website;

deploying the plurality of objects of the website from the a central repository of the central internet content management environment to a remote site operating in a site environment over a network connection, the remote site comprising one of a plurality of sites located remotely from the central internet content management environment, the remote site having endpoint hardware supporting a runtime system and the website and operable to generate web pages and provide the web pages to clients;

modifying a process in the central internet content management environment, the process corresponding to a particular application object of the website already deployed from the central repository to the remote site operating in the site environment; and individually redeploying the particular application object from the central repository of the central internet content management environment into the runtime system of the remote site operating in the site environment to dynamically change operation of the runtime system of the remote site while the applications at the website supported by the runtime system of the remote site are executing, the particular application object corresponding to the process having been modified, wherein the remote site is configured to receive the particular application object and execute or implement the process according to the particular application object's binding, wherein the process, having been modified and executed or implemented by the runtime system of the remote site operating in the site environment, dynamically changes operation of the runtime system of the remote site such that the processes of the runtime system are configured according to the configuration information of the application object, and dynamically changing operation of the runtime system of the remote site while the applications at the website supported by the runtime system of the remote site are executing without having to replace an existing site setup, thereby eliminating a need to restart the applications at the web site.

18. The method of claim 1, wherein the application objects do not include displayable content.

19. The system of claim 9, wherein the application objects do not include displayable content.

20. The non-transitory computer program product of claim 17, wherein the application objects do not include displayable content.

* * * * *